(12) United States Patent
Cheng

(10) Patent No.: US 6,769,813 B2
(45) Date of Patent: Aug. 3, 2004

(54) UNIVERSAL OPTICAL FIBER PLUG

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 66 days.

(21) Appl. No.: 10/014,621

(22) Filed: Oct. 22, 2001

(65) Prior Publication Data

US 2003/0077046 A1 Apr. 24, 2003

(51) Int. Cl.[7] .................................................. G02B 6/36
(52) U.S. Cl. ........................................................ 385/78
(58) Field of Search .......................... 385/78, 137, 138, 385/139, 53, 55, 58, 60, 76; 439/281, 282, 350

(56) References Cited

U.S. PATENT DOCUMENTS

| | | | | |
|---|---|---|---|---|
| 4,707,043 A | * | 11/1987 | Reed | 439/142 |
| 4,736,100 A | * | 4/1988 | Vastagh | 250/227.11 |
| 4,917,632 A | * | 4/1990 | Smith | 439/624 |
| 5,414,790 A | * | 5/1995 | Lee et al. | 385/139 |
| 6,130,983 A | * | 10/2000 | Cheng | 385/139 |
| 6,227,717 B1 | * | 5/2001 | Ott et al. | 385/53 |
| 6,305,849 B1 | * | 10/2001 | Roehrs et al. | 385/59 |
| 6,374,030 B2 | * | 4/2002 | Krow et al. | 385/134 |
| 6,464,543 B2 | * | 10/2002 | Suzuki | 439/736 |

FOREIGN PATENT DOCUMENTS

DE   4229511   * 10/1994   ............ G02B/6/24

* cited by examiner

Primary Examiner—Tulsidas Patel
(74) Attorney, Agent, or Firm—Alan D. Kamrath; Nikolai & Mersereau, P.A.

(57) ABSTRACT

A universal optical fiber plug includes a body, a neck formed on the body, a tube extending out from the neck and an annular sealing ring formed on the neck near the joint with the tube to correspond to the recesses in the socket. A blank plug has a blank plug body, a blank plug neck formed on the blank plug body, a blank plug tube extending out from the blank plug neck, and a sealing ring extending out radially from the blank plug neck. A cap is further formed at a joint of the blank plug body and the blank plug neck to prevent contamination of the filament inside the socket.

10 Claims, 6 Drawing Sheets

UNIVERSAL OPTICAL FIBER PLUG

BACKGROUND OF THE INVENTION

1. Field of the Invention

The present invention relates to a universal optical fiber plug, and more particularly to a plug that is able to connect to an optical fiber socket without having to consider the orientation of the plug so the plug and the socket can be connected easily.

2. Description of Related Art

With reference to FIGS. 5 and 6, a conventional optical fiber plug (50) has a hollow connecting portion (51) and a holding portion (52) for a user to hold when the plug (50) is to be connected to a socket (60). The connecting portion (51) has an open end (53) with a hollow tube (54) extending out from the hollow connecting portion (51) to hold a first optical fiber filament (not shown). A pair of bosses (55) are formed on a top and a bottom face of the connecting portion (51) and a rib (56) is formed on side faces between the top and bottom faces of the connecting portion (51). At the joints of the side faces and the bottom faces, oblique faces (57) relative to the bottom face are formed.

The optical fiber socket (60) has an opening (61) with a receiving block (62) formed inside the opening (61) and a passage (63) defined in the receiving block (62) and aligned with the hollow tube (54) in the plug (50) to hold a second optical fiber (not shown). The first and second filaments (not shown) inside the tube (54) and the passage (63) respectively are able to communicate with each other after the connecting portion (51) is inserted into the opening (61). To ensure that the connection between the optical fiber plug (50) and the socket (60) is made correctly, orientation features are provided in the socket (60) to ensure the proper orientation of the plug (50) and the socket (60) when connected. The orientation features include keyways (64) corresponding to the ribs (56), oblique sidewalls (65) corresponding to the oblique faces (57) and recesses (66) corresponding to the bosses (55). When the connecting portion (51) is inserted into the opening (61) of the socket (60), the ribs (56), the bosses (55) and the oblique faces (57) correspond to the keyways (64), the recesses (66) and the oblique sidewalls (65) respectively to secure the engagement between the optical fiber plug (50) and the optical fiber socket (60). An incorrect connection between the optical fiber plug (50) and the optical fiber socket (60) is impossible. However, workers on a construction site often need to work in resitricted or confined spaces, and the workers finding the right orientation of both the optical fiber plug and socket (50, 60) may be quite difficult and time consuming. Delays associated with making optical fiber cable connections slow down the entire work schedule. Further, home video and acoustic devices often have optical fibers connections on the back of the devices. Because the back of virtually all these devices is close to walls, the users will have to move the devices away from the wall to access the optical fiber connections to make required adjustment. Therefore, dealing with conventional optical fiber plugs especially within a restricted or confined space is difficult.

To overcome the shortcomings, the present invention provides an improved universal optical fiber plug to mitigate and obviate the aforementioned problems.

SUMMARY OF THE INVENTION

The primary objective of the invention is to provide an optical fiber plug that can be connected to an optical fiber socket without regard to the orientation of the optical fiber plug so that the optical fiber plug is able to connect to the optical fiber socket with any orientation.

Other objects, advantages and novel features of the invention will become more apparent from the following detailed description when taken in conjunction with the accompanying drawings.

DETAILED DESCRIPTION OF THE PREFERRED EMBODIMENT

Figure 1:
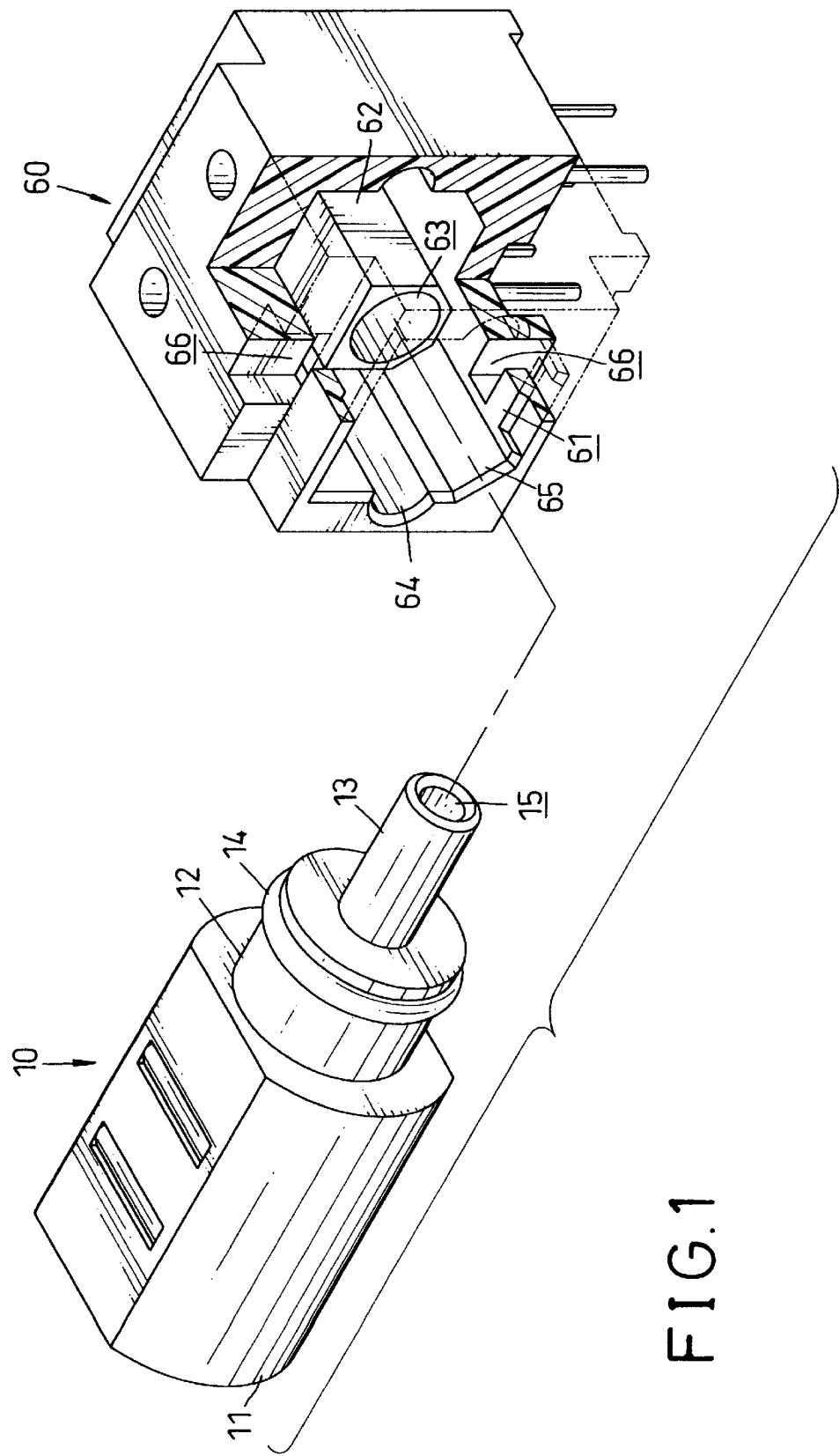
FIG. 1 is a perspective view of an optical fiber plug in accordance with the present invention and conventional socket.

With reference to FIG. 1, the preferred embodiment of the universal optical fiber plug (10) has a body (11), a neck (12), a tube (13) and an annular sealing ring (14). The neck (12) is formed with the body (11). The tube (13) extends out from the neck (12). The annular sealing ring (14) extends out near the joint of the neck (12) and the tube (13). The tube (13) has an axial hollow passage (15) corresponding to the hollow passage (63) in the conventional socket (60). Because the optical fiber socket (60) is conventional and is not the focus of the invention, further description of the detailed structure of the optical fiber socket (60) beyond that provided in the "Description of Related Art" is omitted.

Figure 2:
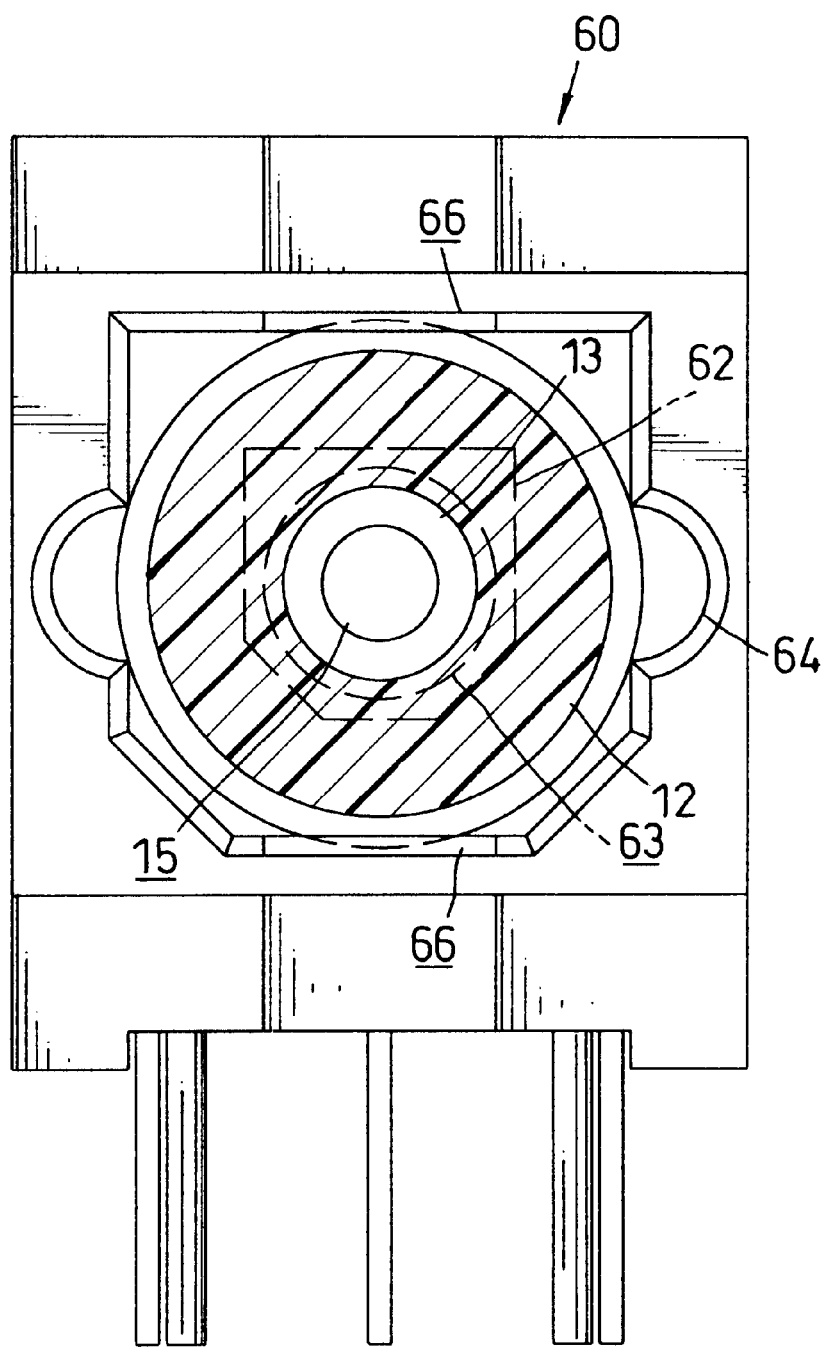
FIG. 2 is a cross sectional end plan view of the optical fiber plug and the socket in FIG. 1 connected together.

With reference to FIG. 2, when the neck (12) of the optical fiber plug (10) is inserted into the opening (61) of the conventional socket (60), the tube (13) is inserted simultaneously into the passage (63). The optical fiber filament inside the hollow passage (15) of the optical fiber plug (10) is able to communicate with the optical fiber filament inside the passage (63) of the conventional optical fiber socket (60). Furthermore, the annular sealing ring (14) is received in the recesses (66) in the upper and lower inner faces defining the opening (61).

Figure 3:
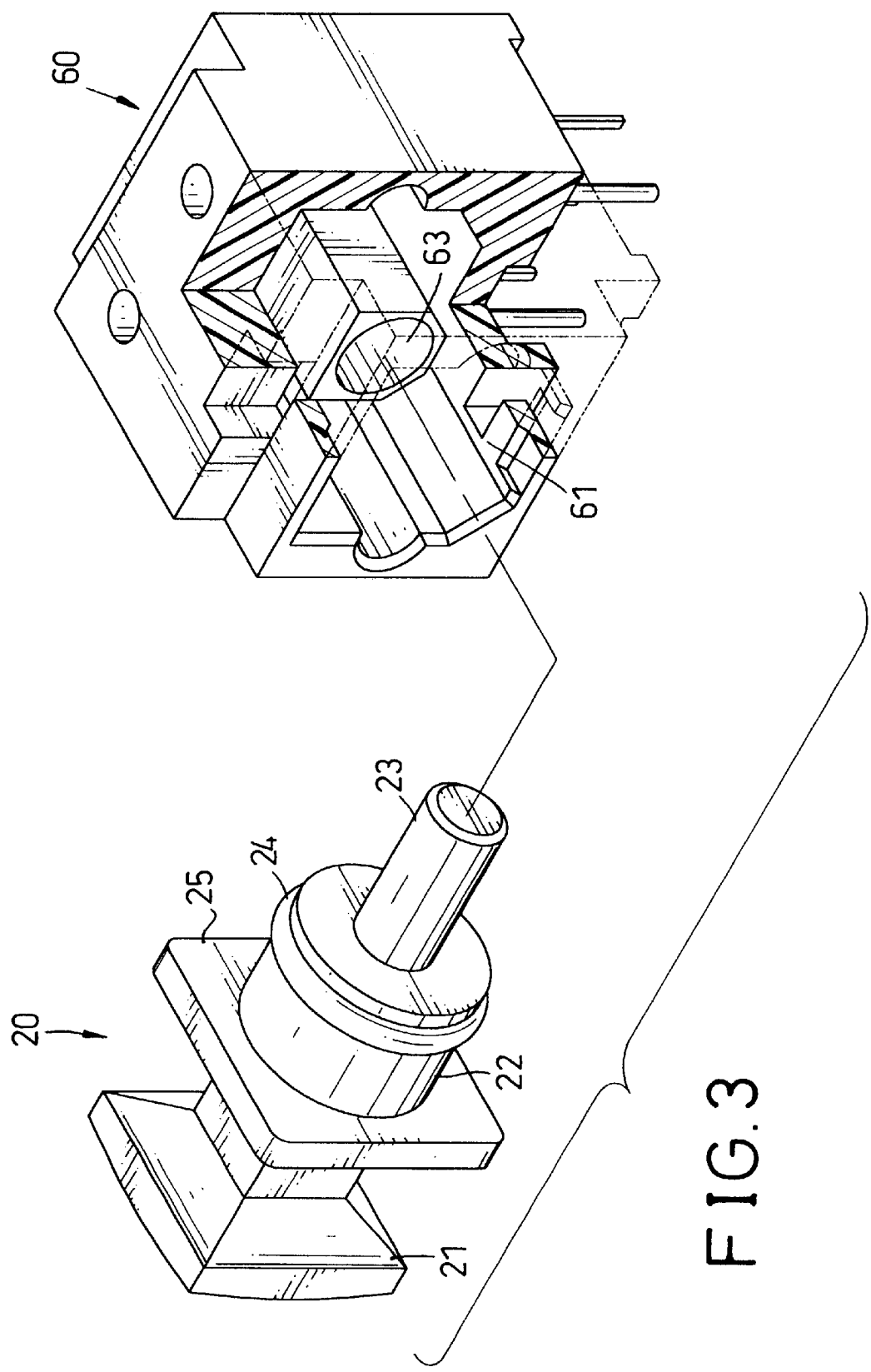
FIG. 3 is a perspective view of another preferred embodiment of an optical fiber plug in accordance with the present invention and conventional socket, wherein the universal structure used in the optical fiber plug is implemented on the plug to correspond to the optical fiber socket in FIG. 1.

With reference to FIG. 3, when the conventional optical fiber socket (60) is not in use, a blank plug (20) is needed to cover the opening (61) of the optical fiber socket (60) to prevent contamination of the optical filament inside the socket (60). The blank plug (20) has a body (21), a neck (22), a tube (23) extending out from the neck (22) and a sealing ring (24) extending out radially from the neck (22) near the joint with the tube (23). Furthermore, a cap (25) is formed at the joint of the body (21) and the neck (22) so that when the tube (23) is inserted into the passage (63) in the conventional socket (60) and the sealing ring (24) is received in the recesses (66), the cap (25) covers the opening (61) in the socket (60) to keep the optical filament from being contaminated by any kind of pollutant.

When the optical fiber plug (10) is to be connected to the conventional optical fiber socket (60), the user never has to worry about the orientation of the plug (10). The user only needs to plug the plug (10) into the socket (60), and the communication between the optical filaments in the plug (10) and the socket (60) is thus accomplished.

Figure 4:
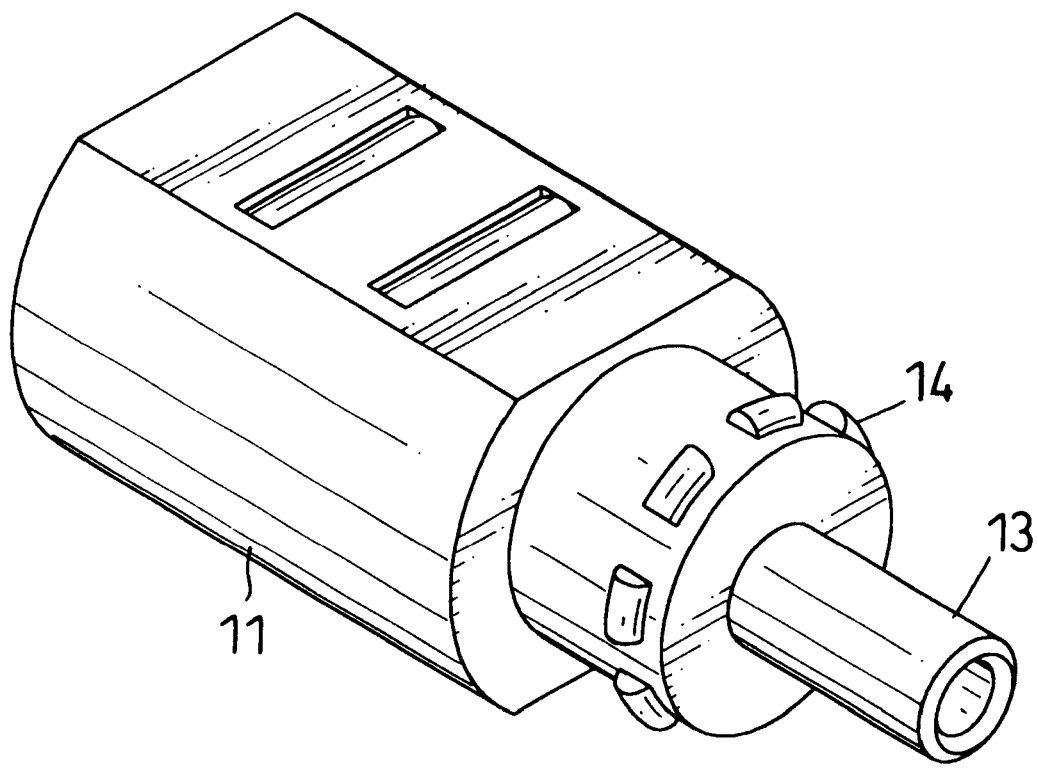
FIG. 4 is a perspective view of another embodiment of the optical fiber plug of the present invention.
Figure 5:
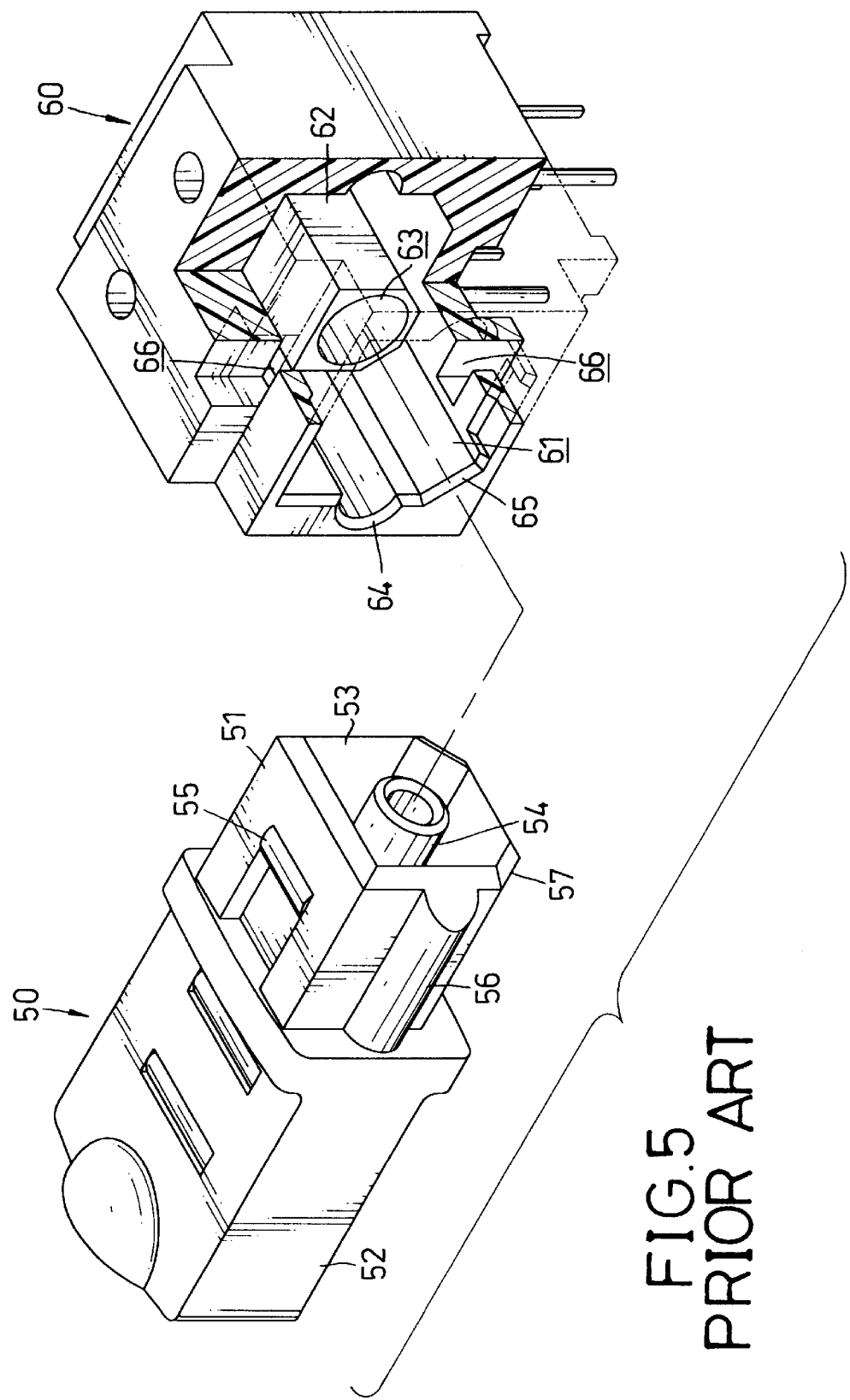
FIG. 5 is a perspective view of a conventional optical fiber plug and socket.
Figure 6:
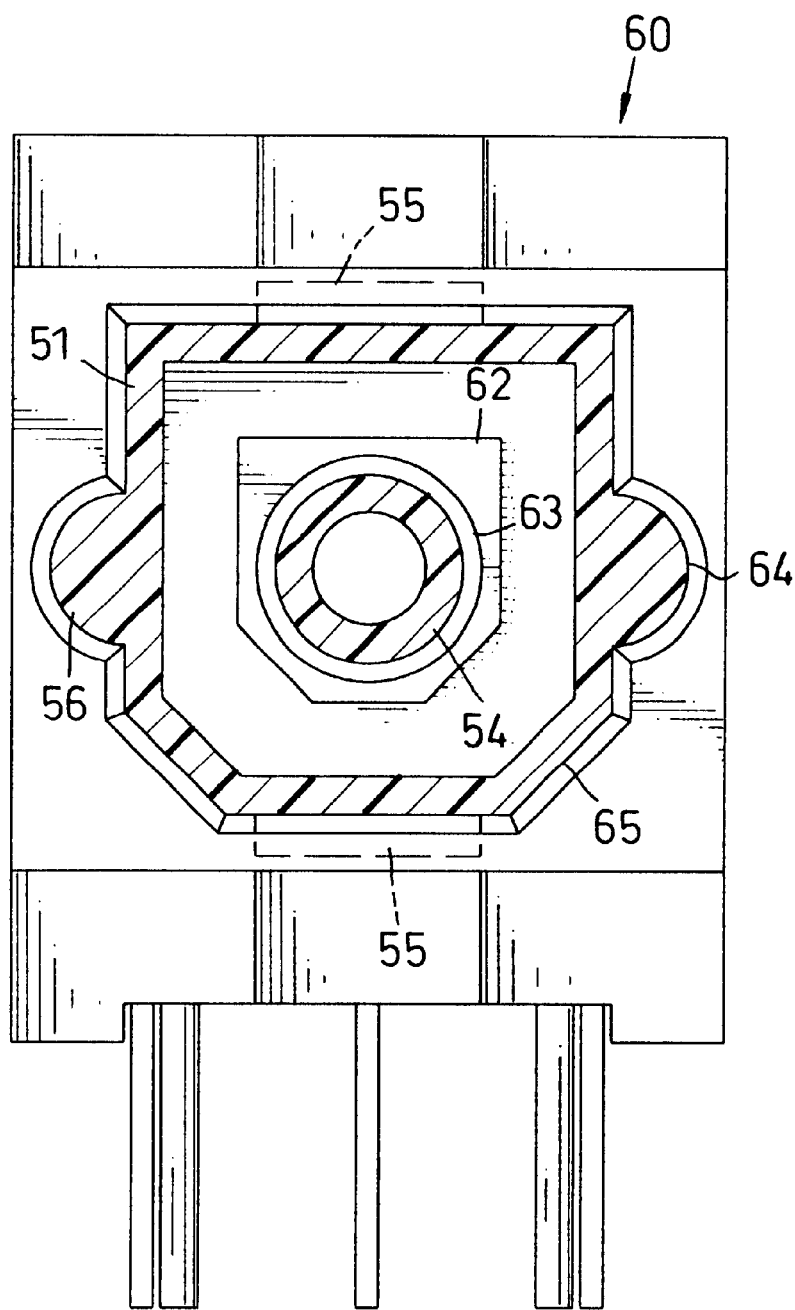
FIG. 6 is a cross sectional end view of the plug and socket in FIG. 4 connected with each other.

With reference to FIG. 4, the annular sealing ring (14) of FIG. 1 may be configured to be intermittently arranged on the neck (12), which still achieves the foregoing objective.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A universal optical fiber plug adapted to mate with an optical fiber socket having an opening with a receiving block formed inside the opening and a passage defined in the receiving block to hold a first optical fiber filament and recesses defined in an inner face defining the opening the universal optical fiber plug comprising:

a body;

a neck formed with the body;

a tube extending out from the neck and having a hollow passage defined to correspond to the passage in the socket to hold a second optical fiber filament;

a sealing ring mounted on and extending out the neck near a joint with the tube, with the tube, the neck and the sealing ring insertable into the opening of the optical fiber socket until the tube is inserted into the passage and the sealing ring is received in the recesses of the fiber optic socket; and a blank plug having a blank plug body, a blank plug neck formed on the blank plug body, a blank plug tube extending out from the blank plug neck and a blank plug sealing ring mounted on and extending out radially from the blank plug neck near a joint with the blank plug tube, with the blank plug tube, the blank plug neck, and the blank plug sealing ring insertable into the opening of the optical fiber socket to prevent contamination of the first optical fiber filament in the optical fib socket.

2. The universal optical fiber plug as claimed in claim 1 further comprising a cap formed at the joint of the blank plug body and the blank plug neck to cover the opening of the optical fiber socket to prevent contamination of the first optical fiber filament in the optical fiber socket.

3. The optical fiber plug as claimed in claim 1 wherein the sealing ring is annular.

4. The optical fiber plug as claimed in claim 3, wherein the sealing ring is intermittently arranged.

5. The optical fiber plug as claimed in claim 2, wherein the sealing ring is annular.

6. The optical fiber plug as claimed in claim 5, wherein sealing ring is intermittently arranged.

7. A universal optical fiber blank plug adapted to mate with an optical fiber socket having an opening with a receiving block formed inside the opening and a passage defined in the receiving block to hold a first optical fiber filament and recesses defined in an inner face defining the opening, the universal optical fiber blank plug comprising:

a blank plug body;

a blank plug neck formed on the blank plug body;

a blank plug tube extending out from the blank plug neck; and a blank plug sealing ring mounted on and extending out radially from the blank plug neck near a joint with the blank plug tube, with the blank plug tube, the blank plug neck, and the blank plug sealing ring insertable into the opening of the optical fiber socket to prevent contamination of the first optical fiber filament in the optical fiber socket.

8. The universal optical fiber blank plug as claimed in claim 7 further comprising a cap formed at the joint of the blank plug body and the blank plug neck to cover the opening of the optical fiber socket to prevent contamination of the first optical fiber filament in the optical fiber socket.

9. The universal optical fiber blank plug as claimed in claim 8, wherein the blank plug sealing ring is annular.

10. The universal optical fiber blank plug as claimed in claim 7, wherein the blank plug sealing ring is annular.

* * * * *